United States Patent
Ardö

(10) Patent No.: US 11,769,222 B2
(45) Date of Patent: Sep. 26, 2023

(54) IMAGE PROCESSOR AND A METHOD THEREIN FOR PROVIDING A TARGET IMAGE

(71) Applicant: Axis AB, Lund (SE)

(72) Inventor: Håkan Ardö, Lund (SE)

(73) Assignee: AXIS AB, Lund (SE)

( * ) Notice: Subject to any disclaimer, the term of this patent is extended or adjusted under 35 U.S.C. 154(b) by 21 days.

(21) Appl. No.: 17/713,285

(22) Filed: Apr. 5, 2022

(65) Prior Publication Data

US 2022/0375025 A1 Nov. 24, 2022

(30) Foreign Application Priority Data

May 24, 2021 (EP) ..................................... 21175491

(51) Int. Cl.
| | |
|---|---|
| *G06T 3/00* | (2006.01) |
| *G06V 10/75* | (2022.01) |
| *G06V 10/20* | (2022.01) |
| *G06V 20/52* | (2022.01) |

(52) U.S. Cl.
CPC .......... *G06T 3/0062* (2013.01); *G06V 10/255* (2022.01); *G06V 10/758* (2022.01); *G06V 20/52* (2022.01); *G06V 2201/07* (2022.01)

(58) Field of Classification Search
CPC .. G06T 3/0062; G06V 10/758; G06V 10/255; G06V 10/20; G06V 20/52; G06V 10/247; G06V 2201/07
USPC .......................................................... 382/108
See application file for complete search history.

(56) References Cited

U.S. PATENT DOCUMENTS

| | | |
|---|---|---|
| 2007/0065014 A1 | 3/2007 | Owechko et al. |
| 2015/0131851 A1 | 5/2015 | Bernal et al. |
| 2016/0210525 A1 | 7/2016 | Yang et al. |
| 2016/0307052 A1 | 10/2016 | Han et al. |
| 2017/0195564 A1* | 7/2017 | Appia ....................... B60R 1/00 |
| 2021/0019914 A1 | 1/2021 | Lipchin et al. |

FOREIGN PATENT DOCUMENTS

| | | |
|---|---|---|
| CN | 102354422 A | 2/2012 |
| JP | 2014-142832 A | 8/2014 |

OTHER PUBLICATIONS

Extended European Search Report dated Nov. 16, 2021 for European Patent Application No. 21175491.6.
Jeereddy, 'Pedestrian Detection on Dewarped Fisheye Images using Deep Neural Networks', Dissertation, (2019).

* cited by examiner

*Primary Examiner* — Kenny A Cese
(74) *Attorney, Agent, or Firm* — Volpe Koenig (57) ABSTRACT

An image processor and a method therein to provide a target image for evaluation with an object detector. The method comprises: obtaining a source image captured by a camera and depicting an object, and applying an inverse pixel transform to each target pixel of a target image to determine one or more source pixels located at a position in the source image corresponding to a position of each target pixel in the target image. The method further comprises assigning, to each target pixel, a target pixel value determined based on one or more source pixel values of the determined one or more source pixels located at the corresponding position, thereby is a size c in the target image of the depicted object of a specific object type normalized in at least one size dimension. Thereafter, the target image is fed to an object detector for evaluation.

9 Claims, 7 Drawing Sheets

Fig. 4B (pinhole camera)  Fig. 4C (fisheye camera)

Fig. 5

Fig. 6A Source image

Fig. 6B Target image

IMAGE PROCESSOR AND A METHOD THEREIN FOR PROVIDING A TARGET IMAGE

FIELD OF INVENTION

The present disclosure relates to an image processor and a method therein for providing a target image for evaluation with an object detector.

TECHNICAL BACKGROUND

When performing image analysis to automatically detect objects in a captured image of a scene, the captured image is fed to an object detector, which executes an object detection procedure on the captured image to detect one or more of the objects. The object detector may also be capable of determining the object type, e.g., the object class, to which the respective detected one or more objects belong.

However, an object captured in an image will be depicted with a size that depends on the distance between the object and the capturing camera. The size of the depicted object in the image will depend on how far from the camera the object is located in both a longitudinal direction and a lateral direction relative to the camera's optical axis. Therefore, the distance may be considered as being composed of two parts; a longitudinal distance being a distance between the object and the camera parallel to, e.g., along, the camera's optical axis; and a lateral distance being a distance between the object and the camera perpendicular to the optical axis. If for example the object is a person walking on the floor in a room and the camera is mounted in the ceiling of the room and captures images of the person from above, the longitudinal distance between the person and the camera will be the same but the lateral distance between the person and the camera will vary when the person is moving towards or away from the camera's optical axis. Thus, even if the same person is at the same longitudinal distance from the camera it will be depicted with a size in the captured image that varies with the lateral distance, i.e., with where in the camera's field of view the person is occurring. If the camera is capturing a video stream comprising a sequence of captured images, and the person is walking on the floor and thus moving in relation to the camera's optical axis, the person will be depicted with different sizes in the captured video stream.

Further, in addition to being dependent on the distance to the camera, the size of the depicted object in the image may also depend on the type of imaging optics used by the camera. For example, the camera may be provided with a fisheye lens, i.e., a wide-angle lens, which will capture objects in the camera's field of view differently from a camera provided with another type of lens. It should be understood that the fisheye lens could be of many different types, even if reference in this disclosure is made to just a fisheye lens. Some example types of fisheye lenses are circular fisheye lenses and full frame fisheye lenses. Alternatively, or additionally, the type of the fisheye lens may be determined based on how a subject is placed in the image by the lens according to a mapping function of the lens. For example, a rectilinear fisheye lens keeps straight lines straight and works like a pinhole camera, a stereographic fisheye lens maintains angles, an equidistant fisheye lens maintains angular distances, an equisolid angle fisheye lens maintains surface relations, and an orthographic fisheye lens maintains planar illuminance.

For an object detector it may be a challenge that the same object may be depicted in the image with a size that depends on the distance between the object and the camera, since that may deteriorate the object detector's ability to correctly detect the object.

A first type of object detector is only able to detect an object of the same size as the object the object detector has been trained on. Usually, those first type of object detectors are only trained on one size for each object. Since the object in the captured image may be of a different size than the object the object detector was trained on, it is common to rescale the captured image into several images having several different resolutions and feed each one of them to the object detector. However, the rescaling of the captured image into several images having several different resolutions consumes both additional time and additional processing resources. Further, when the object detector is run on each of the several images, at least one of them need to have a resolution so the object is depicted with a size corresponding to the size of the object the detector was trained on in order for the object detector to correctly detect the object in that specific image. However, if the captured image is not rescaled into a suitable resolution to depict the object with a size corresponding to the size of the object the detector was trained on, the object may not be detected or may not be correctly detected by the object detector.

In order to overcome the need to rescale the captured image into several images with different resolution and the need to feed all of those images to the object detector of the first type, a second type of object detector is provided which is trained on different sizes for each object. Thereby, the captured image can be fed directly to such second type object detector without being rescaled. However, object detectors of this second type are computationally heavier than object detectors of the first type and the larger span of object sizes it is trained on, the more computational resources will be needed. A third type of object detector may be a combination of the first and second types and will thus to some extent suffer from the same disadvantages as the first and second types of object detectors.

Thus, there is room for improvements in how to provide a target image that is to be evaluated by an object detector.

SUMMARY

In view of the above, mitigating drawbacks with the prior art and to provide techniques for providing a target image that is to be evaluated by an object detector would be beneficial.

According to a first aspect of the disclosure, a method provides a target image for evaluation with an object detector. The method comprises obtaining a source image captured by a camera and depicting one or more objects in a scene. Further, the method comprises applying an inverse pixel transform $T^{-1}$ to each target pixel of a target image to determine one or more source pixels located at a position in the source image corresponding to a position of each target pixel in the target image. Furthermore, the method comprises assigning, to each target pixel, a target pixel value determined based on one or more source pixel values of the determined one or more source pixels located at the corresponding position, thereby is a size c in the target image of depicted one or more objects of a specific object type normalized in at least one size dimension of the depicted one or more objects of the specific object type. Yet further, the method comprises feeding the target image to an object detector for evaluation.

By applying the inverse pixel transform $T^{-1}$ to each target pixel of the target image and by assigning, to each target pixel, the target pixel value determined based on the one or more source pixel values of the determined one or more source pixels located at the corresponding position, the size c in the target image of the depicted one or more objects of the specific object type is normalized in the at least one size dimension of the depicted one or more objects of the specific object type.

By the expression "one or more objects of a specific object type" when used herein is one or more objects being a human being, an animal and/or a vehicle, just to give some examples. Thus, the object may be a person, a dog or a car.

By the expression "normalized in at least one size dimension of the depicted one or more objects of the specific object type" is meant that the size of the depicted one or more objects of the specific type in the target image is made independent of the lateral distance between the one or more objects of the specific type and the camera's optical axis. That means that the one or more objects of the specific type will be depicted with the same or almost the same size in the target image irrespective of their respective lateral distance to the camera's optical axis. This can also be expressed as the one or more objects of the specific type will be depicted with the same or almost the same size in the target image irrespective of where in the source image they are depicted. This is true as long as the longitudinal distance between the one or more objects of the specific type and the camera is kept constant, i.e., the same.

According to a second aspect of the disclosure, an image processor is configured to provide a target image for evaluation with an object detector. The image processor is configured to obtain a source image captured by an image capturing module and depicting one or more objects in a scene. Further, the image processor is configured to apply an inverse pixel transform $T^{-1}$ to each target pixel of a target image to determine one or more source pixels located at a position in the source image corresponding to a position of each target pixel in the target image. Furthermore, the image processor is configured to assign, to each target pixel, a target pixel value determined based on one or more source pixel values of the determined one or more source pixels located at the corresponding position. Accordingly, a size c in the target image of depicted one or more objects of the specific object type is normalized in at least one size dimension of the depicted one or more objects of the specific object type. Yet further, the image processor is configured to feed the target image to an object detector for evaluation.

According to a third aspect of the disclosure, a camera comprises the image processor and is configured to capture the source image depicting the one or more objects in the scene. The camera is configured to provide the source image to the image processor. Further, the camera comprises the object detector configured to receive the target image and to evaluate the target image by performing object detection on the target image.

According to a fourth aspect of the disclosure, a non-transitory computer-readable medium has stored thereon computer code instructions adapted to carry out the method of the first aspect when executed by a device having processing capability.

The second, third and fourth aspects may generally have the same features and advantages as the first aspect. Embodiments of the disclosure are defined in the appended depending claims. It is further noted that the disclosure relates to all possible combinations of features disclosed herein unless explicitly stated otherwise.

BRIEF DESCRIPTION OF THE DRAWINGS

The above, as well as additional objects, features and advantages of the present disclosure, will be better understood through the following illustrative and non-limiting detailed description of embodiments of the present disclosure, with reference to the appended drawings, where the same reference numerals will be used for similar elements, wherein.

DETAILED DESCRIPTION

The present disclosure will be described more fully hereinafter with reference to the accompanying drawings, in which embodiments of the disclosure are shown.

Figure 1:
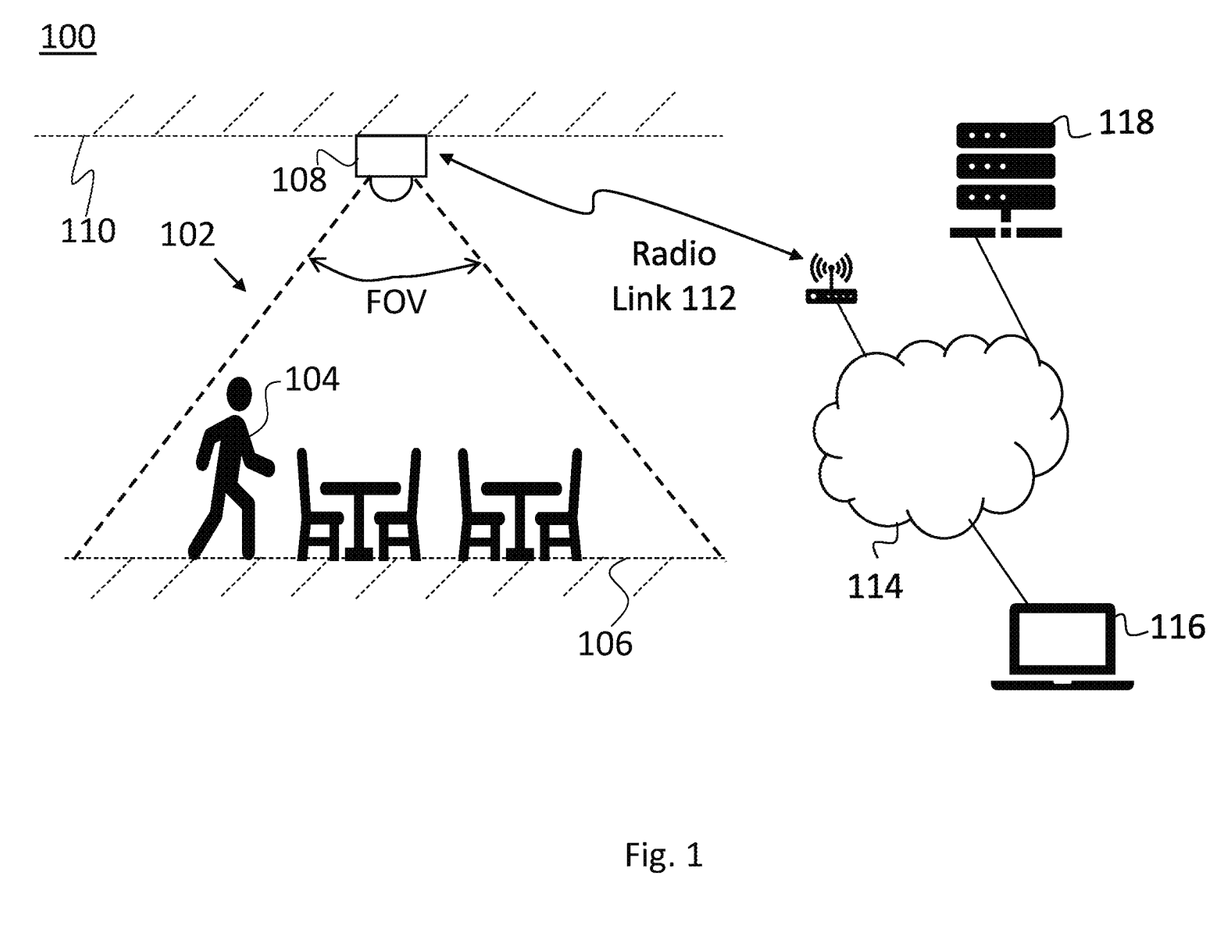
FIG. 1 schematically an exemplary environment in which various embodiments of the disclosure can be implemented.

FIG. 1 shows a schematic diagram of an exemplary environment 100 in which various embodiments of the disclosure can be implemented. As can be seen in FIG. 1, a scene 102 with an object 104, e.g., a person walking on a floor 106 in for example a restaurant or an office or in a retail store, is captured by a camera 108 mounted in a ceiling 110. The scene 102 of the exemplary environment comprises also two free tables. It should be noted that the depiction of the scene 102 is merely a simplistic view for illustrative purposes. A scene can be described, in a more general sense, as any three-dimensional physical space whose size and shape are defined by the field of view (FOV) of a camera, e.g., the camera 108, recording the scene. Further, it should be understood that the camera 108 may be mounted at other suitable places to capture images of the scene from above, such as on a building, at a pole, on a wall or a fence, and thus that the mounting in the ceiling 110 is just given as an example. Furthermore, it should also be understood that when the camera 108 for example is mounted outdoors the object 104 may be moving on a pavement, a road or on the ground, just to give some example. However, in this disclosure reference is in general made to the ground for both indoor and outdoor scenarios without any intention to be limiting. As mentioned, the object 104 may be a person but it could also be an animal, a bag, a sign, a crate, or a vehicle, just to give some examples.

The term field of view refers to the part of the scene that is visible through the camera 108 at a particular position and orientation in space of the camera 108 and at a particular zoom setting of the camera 108. The particular position is given by the installation location and the orientation is given by the pan setting and/or tilt setting of the camera. Thus, it should be understood that the field of view may depend on one or more different camera parameters. For example, the field of view may depend on the installation location of the camera 108 such as height above ground, the type of camera lens, the zoom setting of the camera 108, the pan setting of the camera 108 and/or the tilt setting of the camera.

The camera 108 may be a monitoring camera, sometimes also referred to as surveillance camera. Further, the camera may be a fixed camera, e.g., a stationary camera, or a movable camera, e.g., a pan, tilt and zoom (PTZ) camera. The camera 108 may be a visible light camera, a thermal camera, or a camera comprising both a visible light camera and a thermal camera.

As further illustrated in FIG. 1, the camera 108 may be configured to transmit, e.g., wirelessly over a radio link 112, captured images to a network 114, and eventually to a client 116 and/or a server 118, which may be connected to the network 114. The captured images may be transmitted as a stream of images, e.g., as a video stream, to the network 114. It should be understood that there are many combinations of wireless and wired transmission models that can be used for transmissions between the camera 108 and the network 114, and between the network 114 and the client 116 and/or server 118, and that FIG. 1 only illustrates one example.

The client 116 may have a display where an operator can view images and/or video streams from the camera. Typically, the client 116 is also connected to the server 118, where the images and/or video streams can be stored and/or processed further. The client 116 may be used to control the camera 108, for example, by the operator issuing control commands at the client 116.

Figure 2:
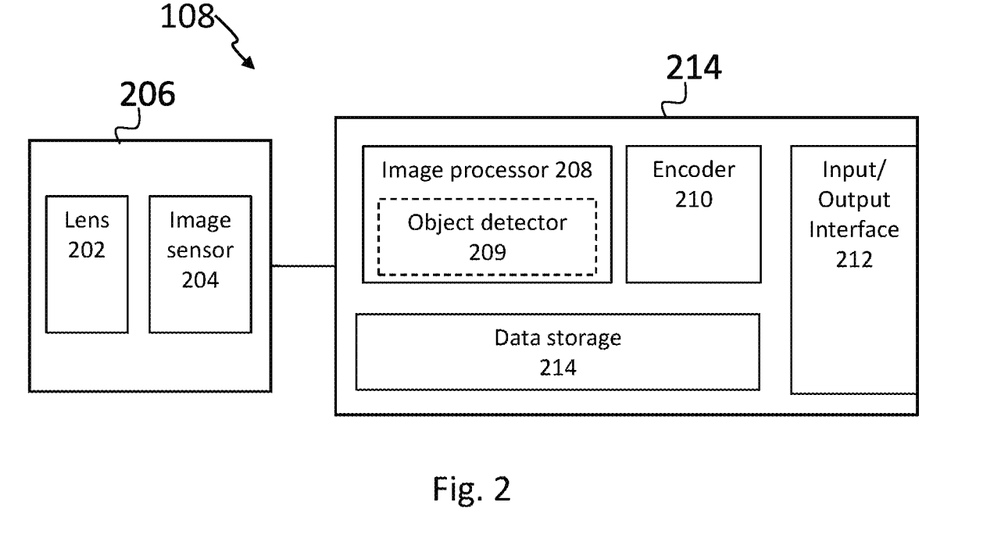
FIG. 2 schematically illustrates a camera according to embodiments.

FIG. 2 schematically illustrates embodiments of the camera 108. The camera 108 may comprise a lens 202, e.g., a fisheye lens or a narrow-angle lens, that captures the scene 102 and projects it onto an image sensor 204. In this disclosure a camera with a narrow-angle lens is sometimes referred to as a pinhole camera. By the term "narrow-angle lens" when used herein is meant a lens that covers lens settings from approximately 15 degrees to 5 degrees or less. The image sensor 204 may be a conventional complementary metal-oxide-semiconductor (CMOS) sensor. Together, the lens 202 and image sensor 204 may form an image capturing module 206. The image sensor 204 captures images forming the video streams.

The camera 108 comprises further an object detector 209. The object detector 209 may be implemented in software, e.g., as an object detection algorithm, to determine object recognitions in a captured image of the scene 102. Alternatively, or additionally, the object detector 209 may implemented as an object detection neural network, e.g., a convolutional neural network (CNN), performing an object detection algorithm to determine the object recognitions in the captured image of the scene 102. These object recognitions may be associated with their images by including them as metadata to the images. The association may be kept through the subsequent encoding process that is performed by the encoder 210 of the camera 108. Object detectors as such are well known to those having ordinary skill in the art and thus will not be described in any more detail in this disclosure.

The camera 108 comprises also an image processor 208, an encoder 210 and an input/output interface 212.

The image processor 208, sometimes referred to as an image processing pipeline, processes captured images by different processing algorithms. In FIG. 2, the image processor 208 is illustrated as comprising the object detector 209. However, it should be understood that this is only an exemplary illustration and that the object detector 208 may be arranged external of the image processor 208.

The image processor 208 may be configured to perform a range of various other operations on images received from the image sensor 204. Such operations may include filtering, demosaicing, colour correction, noise filtering for eliminating spatial and/or temporal noise, distortion correction for eliminating effects of e.g., barrel distortion, global and/or local tone mapping, e.g., enabling imaging of scenes containing a wide range of intensities, transformation, e.g., rotation, flat-field correction, e.g., for removal of the effects of vignetting, application of overlays, e.g., privacy masks, explanatory text, etc.

Following the image processor 208, the images are forwarded to the encoder 210, in which the images are encoded according to an encoding protocol and forwarded to a receiver, e.g., the client 114 and/or the server 116, over the network 112 using the input/output interface 212. It should be noted that the camera 108 illustrated in FIG. 2 also includes numerous other components, such as processors, memories, etc., which are common in conventional camera systems and whose purpose and operations are well known to those having ordinary skill in the art. Such components have been omitted from the illustration and description of FIG. 2 for clarity reasons.

The camera 108 may also comprise a data storage 214 for storing data relating to the captured images, to the processing of the captured images and to the object recognitions, just to give some examples. The data storage may be a non-volatile memory, such as an SD card.

There are a number of conventional video encoding protocols. Some common video encoding protocols that work with the various embodiments of the present disclosure include: High Efficiency Video Coding (HEVC), also known as H.265 and MPEG-H Part 2; Advanced Video Coding (AVC), also known as H.264 and MPEG-4 Part 10; Versatile Video Coding (VVC), also known as H.266, MPEG-I Part 3 and Future Video Coding (FVC); VP9, VP10 and AOMedia Video 1 (AV1), just to give some examples.

As mentioned, the input and output interface 212 is configured to act as a communication interface between the camera 108, the network 112 and one or more receiving devices such as the client 114 and the server 116. Thus, the camera 108 may receive instructions from the client 114 and may transmit video streams to the client and/or the server 116 via the input and output interface 212.

The image processor 208, the encoder 210 and the input/output interface 212 may form an image processing and encoding module 214, which is connected to the image capturing module 206. The image capturing module 206 and the image processing and encoding module 214 may be arranged as two separate units arranged at a distance from each other and in communication with each other. In such scenario the camera 108 may also be referred to as a camera system. Alternatively, the image capturing module 206 and the image processing and encoding module 214 may be arranged as a single unit comprised in the camera 108. Further, the image capturing module 206 may be movable, e.g., in pan and/or tilt directions, while the image processing and encoding module 214 may be stationary.

Figure 3:
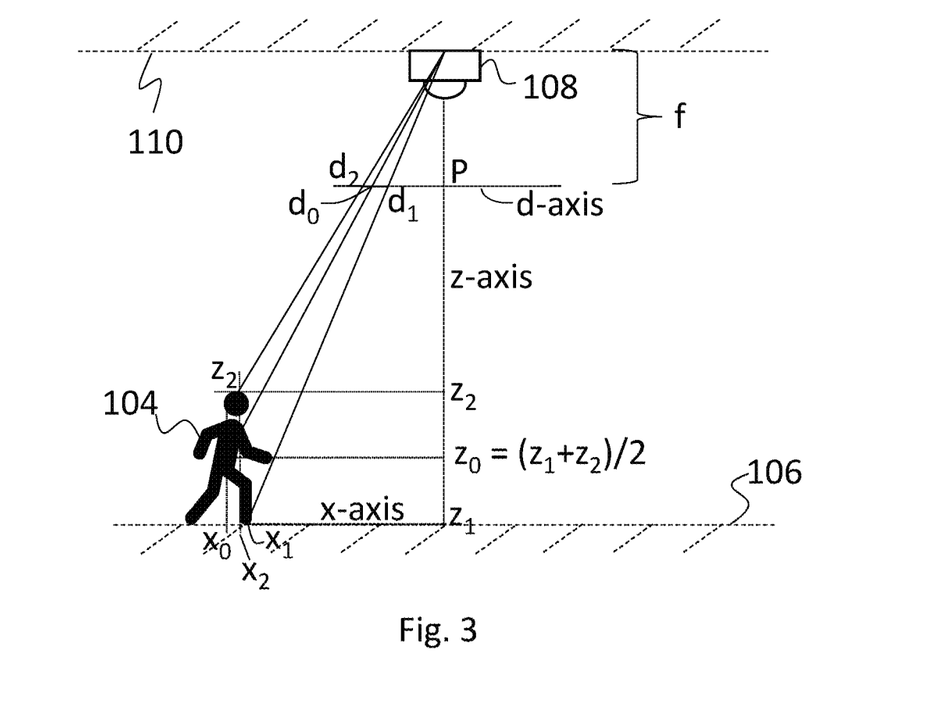
FIG. 3 schematically illustrates an exemplifying geometrical relationship between a camera and an object.

FIG. 3 schematically illustrates an exemplifying geometrical relationship between the camera 108 mounted in the ceiling 110 and the object 104, e.g., the person, walking on the floor 106 under the camera 108. It should be understood that the figure is only for illustration and not drawn to scale. The coordinate system used to describe the actual geometric relation between the camera 108 and the object 104 is given by the x-axis, y-axis and the z-axis. The y-axis is perpendicular to both the x-axis and the z-axis, and is not shown in the figure. The z-axis may also be referred to as the optical axis. A longitudinal distance between the camera 108 and the object 104 is determined as a distance along or parallel to the optical axis, while a lateral distance between the camera 108 and the object 104 is determined as a distance perpendicular to the optical axis. The x,y,z-coordinate system is sometimes in this disclosure referred to as the world coordinate system, as opposed to an image coordinate system used when describing or referring to locations or points in an image captured by the camera 108. The image plane is displaced along the optical axis, i.e., along the z-axis, and the position where the optical axis intersects the image plane is called the principal point P. The distance between the image plane and the optical centre of the camera 108 is called the focal length f.

As illustrated in FIG. 3, the camera 108 is mounted a distance $z_1$ from the floor 106. The top of the person's head is at a longitudinal distance $z_2$ and at a lateral distance $x_2$ from the camera 108. Since the person is walking on the floor 106, the person's height can be determined as $z_1-z_2$. Further, FIG. 3 illustrates that the centre of the person along the z-axis is $z_0$ which can be determined as $z_0=(z_1+z_2)/2$.

FIG. 3 also schematically illustrates the image plane which extends along the d-axis and along an axis (not shown) being perpendicular to the d-axis and the z-axis. For simplicity of drawing, the image plane is illustrated in front of the camera 108, i.e., between the camera 108 and the person 104, so the person's feet at $z_1$ will be captured at a position $d_1$ in the image and the person's top of the head at $z_2$ will be captured at a position $d_2$ in the image. In correspondence, the person centre at $z_0$ is captured at do in the image. However, as understood by those skilled in the art, the image plane is comprised within the camera 108. It should also be understood that the image plane is arranged within the camera at a focal length f from the optical centre of the camera. In FIG. 3 the focal length f is exaggerated for illustrative purpose.

Figure 4A:
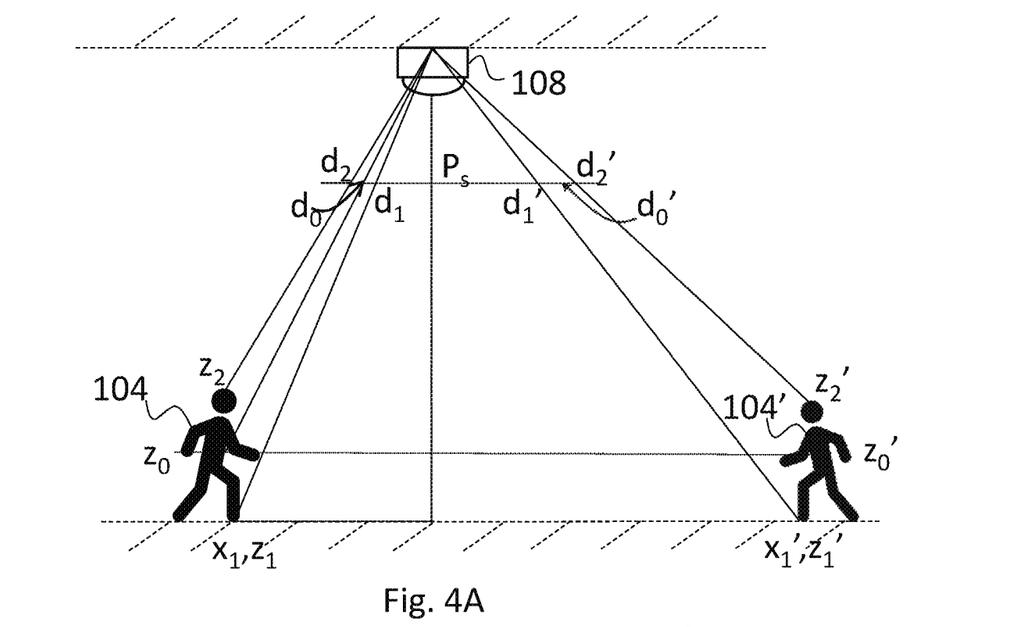
FIG. 4A schematically illustrates an exemplifying geometrical relationship between a camera and two objects.

FIG. 4A is similar to FIG. 3 but with two persons 104, 104' in the scene, i.e., within the field of view of the camera 108 mounted in the ceiling 110. The two persons are assumed to be of the same height and are assumed to be walking on a floor at the same longitudinal distance from the camera 108. However, the two persons are at different lateral distances from the camera 108. That is $z_1'=z_1$, $z_2'=z_2$, and $z_0'=z_0$, but $x_1 \neq x_1'$.

Figure 4B:
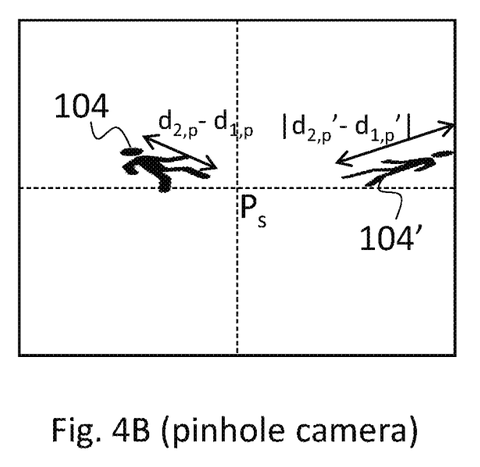
FIGS. 4B and 4C schematically illustrate a source image captured by a pinhole camera and a fisheye camera, respectively.

FIG. 4B schematically illustrates an image of the scene illustrated in FIG. 4A and captured by the camera 108 being a pinhole camera. As schematically illustrated in FIG. 4B, the second person 104' at a larger lateral distance $x_1'$ from the optical axis, compared to the first person 104 being at a lateral distance $x_1$ from the optical axis, will be depicted larger than the first person 104 in the image captured by the pinhole camera. In FIG. 4B, the first person 104 will be depicted with a height given as $d_{2,p}-d_{1,p}$, wherein $d_{2,p}$ is the radius from the principal point P of the captured image to the first person's top of the head, and $d_{1,p}$ is the radius from the principal point P to the first person's foot. In correspondence, the second person 104' will be depicted with a height given as $|d_{2,p}'-d_{1,p}'|$, wherein $d_{2,p}'$ is the radius from the principal point P of the captured image to the second person's top of the head, and $d_{1,p}'$ is the radius from the principal point P to the second person's foot.

Figure 4C:
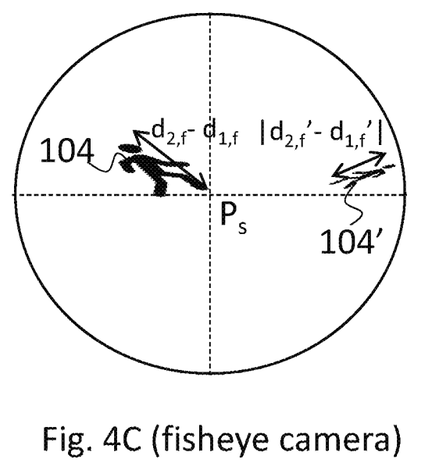

FIG. 4C schematically illustrates an image of the scene illustrated in FIG. 4A and captured by the camera 108 when being a fisheye camera. As schematically illustrated in FIG. 4C, the second person 104' at a larger lateral distance $x_1'$ from the optical axis, compared to the first person 104 being at a lateral distance $x_1$ from the optical axis, will be depicted smaller than the first person in the image captured by the fisheye camera. In FIG. 4C, the first person 104 will be depicted with a height given as $d_{2,f}-d_{1,f}$, wherein $d_{2,f}$ is the radius from the principal point P of the captured image to the first person's top of the head, and $d_{1,f}$ is the radius from the principal point P to the first person's foot. In correspondence, the second person 104' will be depicted with a height given as $|d_{2,f}'-d_{1,f}'|$, wherein $d_{2,f}'$ is the radius from the principal point P of the captured image to the second person's top of the head, and $d_{1,f}'$ is the radius from the principal point P to the second person's foot.

It should be noted that in the image captured with the pinhole camera, a non-flat object, e.g., an object having an extension in the longitudinal direction being larger than its extension in the lateral direction, being located close to the optical axis is depicted smaller than the same non-flat object when being located far from the optical axis. The difference in depicted sizes of the same non-flat object at different distances from the optical axis will increase with an increasing extension of the object in the longitudinal direction. Thus, if the object is a person and the extension in the longitudinal direction is given by the person's length, the difference in depicted sizes of the person when being at different distances from the optical axis will increase with increasing length of the person. This means that, in the image captured with the pinhole camera, a non-flat object with a given extension in the longitudinal direction and being at a smaller lateral distance from the optical axis is depicted smaller than the same object would have been depicted had it been at a larger lateral distance. For an image captured by the fisheye camera the opposite is true, i.e., the non-flat object will be depicted larger when being closer to the optical axis than when being farther away from the optical axis. By embodiments disclosed herein, an object 104 at the same longitudinal distance from the camera 108 will be depicted with the same or almost the same size in the target image irrespective of its lateral distance to the optical axis, i.e., irrespective of where in the camera's field of view the object occurred, and thus irrespective of being depicted with different sizes in the source image.

Figure 5:
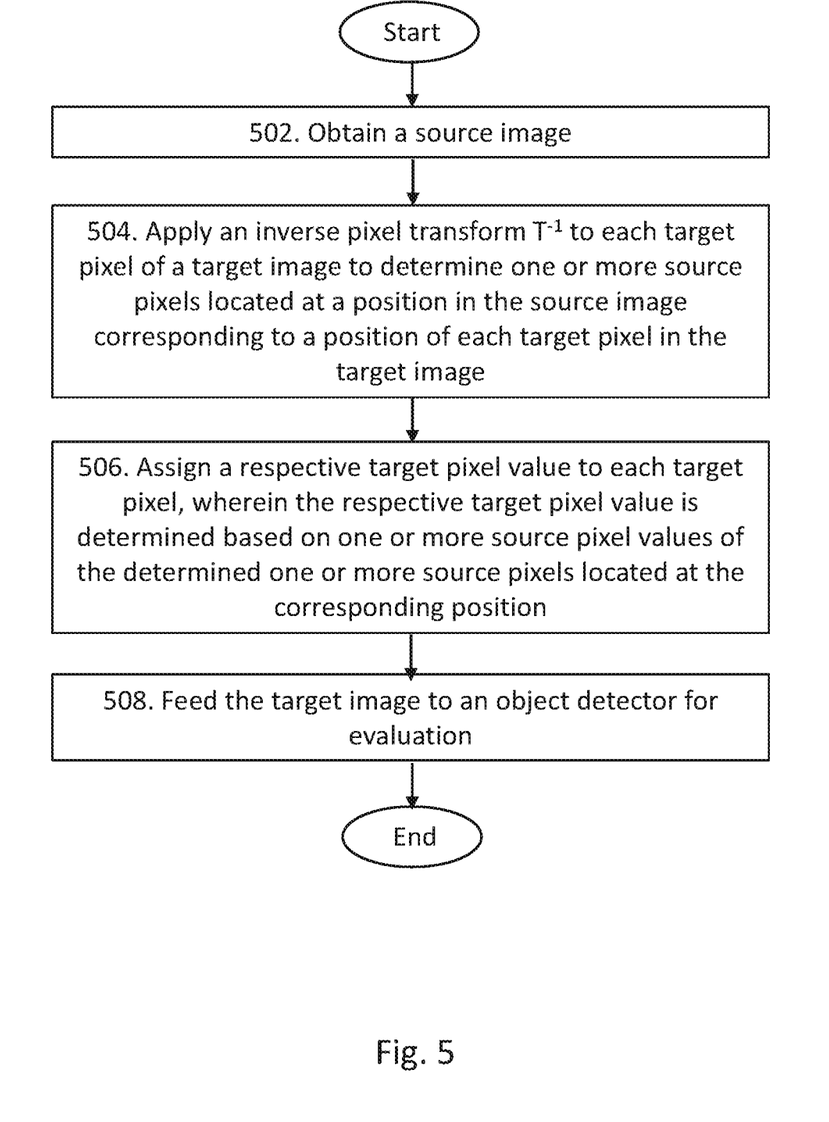
FIG. 5 is a flowchart of a method for providing a target image according to embodiments.

A method to provide a target image that is to be evaluated with an object detector, e.g., the object detector 209, will now be described with reference to the flowchart of FIG. 5. As will be described below, the target image is prepared based on a source image. For example, the source image may be one of the captured images mentioned above in relation to FIGS. 4B and 4C. Thus, the source image may be an image captured by a pinhole camera or by a fisheye camera, i.e., a camera provided with a fisheye lens. However, it should be understood that the image may be captured by another suitable camera at hand. Further, it should be understood that the method illustrated in FIG. 5 may be performed by different parts of the camera 108, that some of the actions may be optional and that actions may be taken in another suitable order. Furthermore, in this disclosure one or more actions are described as being performed on a source image. This should be understood as one or more actions may be performed on a captured image, e.g., on a temporal part of a captured video stream.

In action 502, a source image captured by the camera 108 is obtained. The source image depicts one or more objects 104 in the scene 102. The one or more objects 104 may be of one or more object types. For example, the one or more object types may be a human being, an animal or a vehicle. Thus, the object may be a person, a dog or a car. The source image may be captured by the image capturing module 206 of the camera 108. As previously mentioned, the image capturing module 206 may comprise the lens 202, e.g., a fisheye lens, and the image sensor 204. The source image has an image format corresponding to the size of the image sensor 204 such that each source pixel in the source image corresponds to a read out from a corresponding sensor element of the image sensor 204. For example, a source image format may be 1024×1024, 1920×1080, 2560×1440, 2880×2880 or 4096×2160 pixels. The image processor 208 may obtain the captured source image directly from the image capturing module 206, from an internal storage, e.g., the data storage 214 of the camera 108, or from an external device via the input/output interface 212.

In action 504, an inverse pixel transform $T^{-1}$ is applied to each target pixel of a target image to determine one or more source pixels located at a position in the source image corresponding to a position of each target pixel in the target image. Thus, the inverse pixel transform $T^{-1}$ is applied to every pixel of the target image irrespective of where in the source image the one or more objects 104 may occur. This means that the source image is not processed in any way to detect the one or more objects 104 or their locations in the source image before the inverse pixel transform $T^{-1}$ is applied to the target image. Instead by applying the inverse pixel transform $T^{-1}$ to the target image, the target image is provided based on the captured source image in such a way that an object of a specific object type will be depicted in the target image with a size that has been normalised in at least one dimension irrespective of where in the source image it is depicted. This will be described in more detail below. The target image is of an image format suitable for being analysed by the object detector 209. For example, a suitable target image format may be 1024×1024, 1536×1536, 1920× 1080, 2048×512, 2560×1440, or 4096×2160 pixels. It should be understood that the source image format and target image format do not have to be the same.

In some embodiments, the inverse pixel transform $T^{-1}$ takes as input an assumed size in the at least one size dimension of the object 104 of the specific object type, one or more mounting parameters of the camera 108, and a distance $d_t$ from the principal point P of the target image to the target pixel to which the inverse pixel transform $T^{-1}$ is to be applied.

For example, the assumed object size may be an assumed object height and/or an assumed object width, and the one or more mounting parameters may comprise a camera mounting height above ground. The assumed object size and the one or more mounting parameters are given in the world coordinate system. If, for example, the object 104 of the specific type is a person, the assumed size in the at least one size dimension of the object 104 may be an assumed length of the person. For example, the assumed length of the person may be set to an average length of a human being e.g., set to a value in the range 1-2 meter, such as 1.8 m. The assumed size may be a predetermined value.

The closer the assumed size in the at least one dimension is to the object's 104 real size in the at least one dimension, the better result of the inverse pixel transform is obtained. Thus, a better normalisation of the depicted object's size in the at least one dimension in the target image will be achieved when the assumed size in the at least one dimension is the same as or close to the object's real size in the at least one dimension as compared to the case when the object's real size differs from the assumed size. Therefore, it may be advantageous to select the assumed size depending on the type of object to be depicted and the expected size of that object.

Different inverse pixel transforms $T^{-1}$ will be described in more detail below. The different inverse pixel transform $T^{-1}$ have all in common that they are rotationally symmetric around the principal point $P_t$ of the target image. This may also be expressed as they are rotational symmetric around the principal point $P_s$ of the source image, and around the camera's 108 optical axis, i.e., around the z-axis. It should be understood that the inverse pixel transforms $T^{-1}$ may be applied also for wall mounted cameras or other cameras not capturing images from above the object 104. In such scenarios, the source image is captured by the wall mounted camera, and a new inverse pixel transform $T_{new}^{-1}$ is determined. The new inverse pixel transform $T_{new}^{-1}$ gives as a virtual intermediate image an image of the source image had it been captured by a camera mounted in the ceiling at the same height as the wall mounted camera. By combining the new inverse pixel transform $T_{new}^{-1}$ with the inverse pixel transform $T^{-1}$ a combined inverse pixel transform $T_{com}^{-1}$ is obtained which may be applied to each target pixel of the target image to determine one or more source pixels located at a position in the source image corresponding to a position of each target pixel in the target image.

In action 506, a respective target pixel value is assigned to each target pixel. The respective target pixel value is determined based on one or more source pixel values of the determined one or more source pixels located at the corresponding position. Thereby is a size c in the target image of depicted one or more objects 104 of a specific object type normalized in at least one size dimension of the depicted one or more objects of the specific object type. It should be understood that when the inverse pixel transform $T^{-1}$ is applied to the target pixel, it may find a location in the source image that contributes to the target pixel, i.e., to the target pixel value. This location does not have to correspond to source pixels in the source image but may be a location between two or more source pixels. In such case, an image value for the location may be determined by performing an interpolation of two or more source pixel values of two or more source pixels surrounding the location. If more than one such location in the source image contribute to the target pixel value, the target pixel value may be determined by performing an interpolation of the more than one such location. The interpolation may be a nearest-neighbour interpolation, a bicubic interpolation, a bilinear interpolation or another interpolation suitable for interpolating image values. The interpolation may additionally or alternatively comprise a downscaling interpolation such as a Lanczos interpolation, a spline interpolation, an area interpolation or a mipmap interpolation. These interpolations are well known to a person skilled in the art and will therefore not be described in more detail.

Figure 6A:
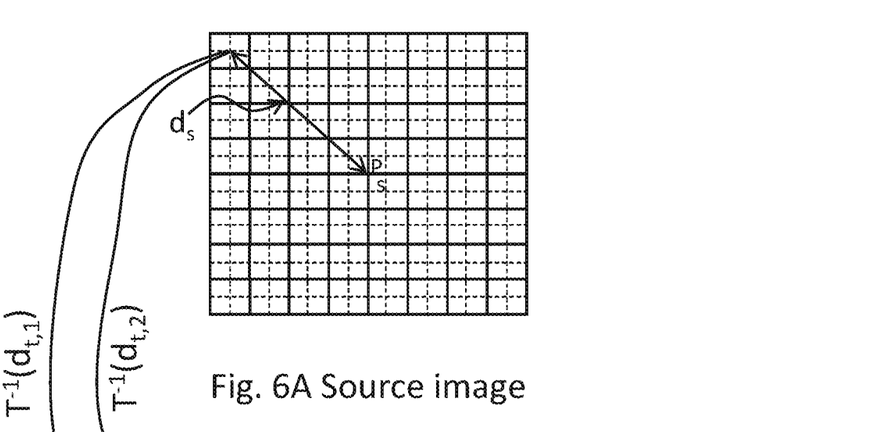
FIGS. 6A and 6B schematically illustrate source pixels of a simplified source image assumed to be captured by a fisheye camera according to embodiments, and target pixels of a simplified target image, respectively.
Figure 6B:
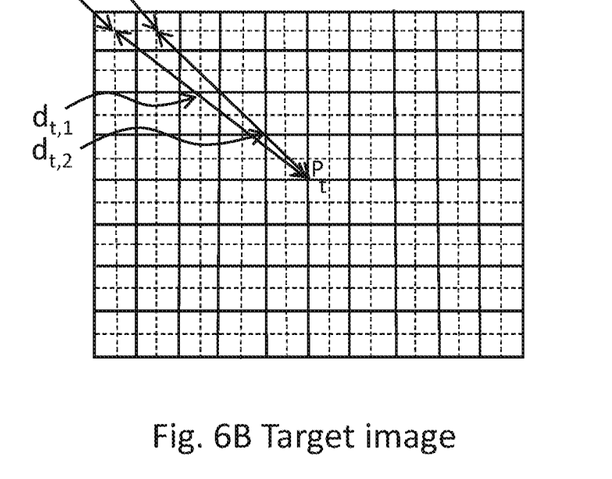

Actions 504 and 506 will now be described with reference to the exemplifying FIGS. 6A and 6B. FIG. 6A schematically illustrates source pixels of a simplified source image assumed to be captured by the camera 108 having a fisheye lens, and FIG. 6B schematically illustrates target pixels of a simplified target image. In FIGS. 6A and 6B, the cross-section of the dashed lines within each pixel represents the position of the pixel value for that pixel. Since the source image is assumed to have been taken by the camera 108 having a fisheye lens, an object of the specific type being at a larger lateral distance and thus being depicted farther away from the principal point $P_s$ in the captured source image need to be enlarged in the target image relatively the same object when being at a smaller lateral distance and thus being depicted closer to the principal point $P_s$. Thereby, the depicted size of the object in the target image is changed so it is depicted with the same size in the target image irrespective of where in the captured source image it is depicted. Thus, if the object 104 is a person and the assumed object size in the at least one dimension is a length equal to 1.8 m, the person in the target image should be depicted with the same size relative to this assumed object size irrespective of where in the target image the person is depicted. In other words, the depicted size of the person should be rescaled to arrive at a size in the target image that is the same or almost the same irrespective of where in the source image the object is depicted. This may be referred to as normalising the size of the depicted object in the target image.

As shown, the inverse pixel transform $T^{-1}$ will result in that the target pixels at a distance $d_{t,1}$ and $d_{t,2}$, respectively, from the principal point $P_t$ of the target image will both obtain the source pixel value of the source pixel at a distance $d_s$ from the principal point $P_s$ in the source image. Thereby, an object at distance $d_s$ from the principal point $P_s$ in the source image will be enlarged in the target image. It should be understood that when the source image is captured by the camera 108 being a pinhole camera the opposite is true, i.e., in analogy with the example above, two pixels in the source image will be combined into one pixel of the target image and thereby reducing the size of the object in the target image.

Figure 7A:
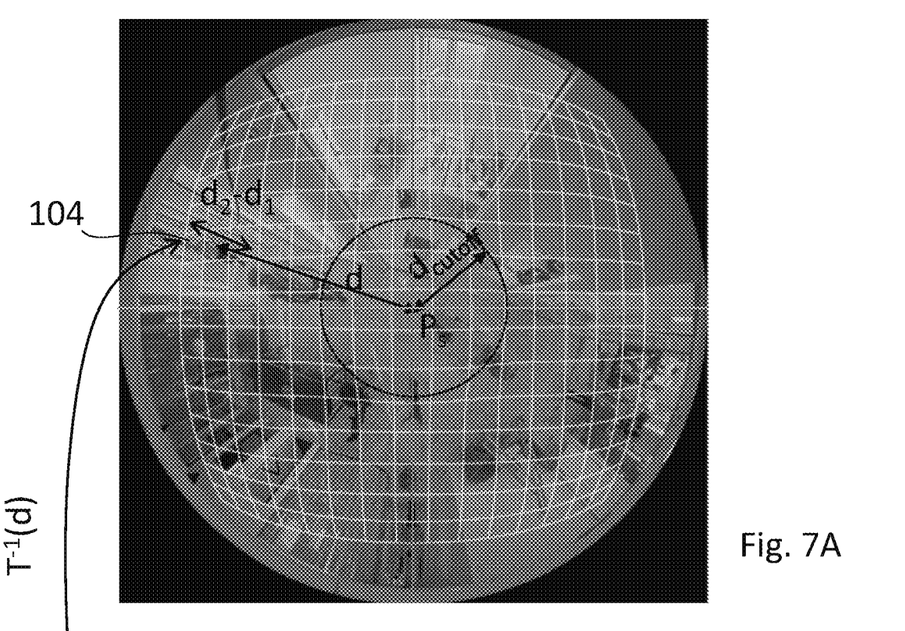
FIGS. 7A and 7B schematically illustrate a source image captured by a fisheye camera and a corresponding target image, respectively.
Figure 7B:
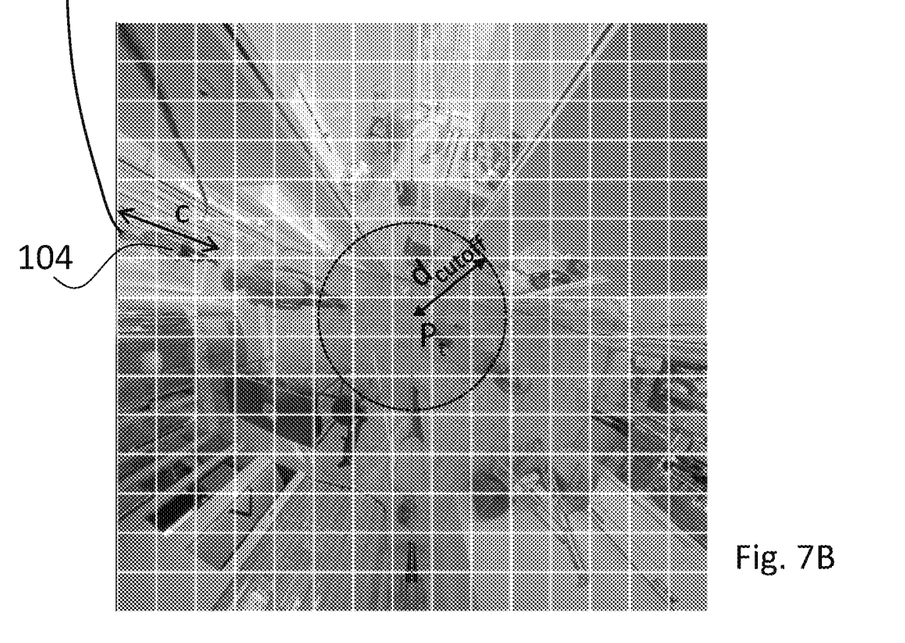

FIGS. 7A and 7B schematically illustrate a source image captured by the camera 108 when being a fisheye camera and a corresponding target image, respectively. There is a one-to-one relationship between the illustrated grid in FIG. 7A and the illustrated grid in FIG. 7B, meaning that for each target pixel within one of the boxes in the grid of FIG. 7B corresponding one or more source pixels are determined within a corresponding box in the grid of FIG. 7A. Since the source image illustrated in FIG. 7A is captured by the fisheye camera the grid of the source image is illustrated as having a convex non-rectilinear appearance. Further, in FIG. 7A the projected length of one object is illustrated as $d_2-d_1$, and in FIG. 7B the transformed length of the object is illustrated as c. Further, in the source image and the target image the same person is depicted at five different locations. In the source image the projected length of the person is different between the five different locations depending on the distance from the location to the principal point of the source image. However, in the target image the transformed length of the person is the same or almost the same at all the five different locations. Thus, the size of the object, e.g., the length, has been normalized in at least one dimension.

In action 508, the target image is fed to the object detector 209 for evaluation. Thus, the target image is provided to the object detector 209. For example, the image processor 208 may provide the target image directly to the object detector 209 or via the data storage 214 from where the object detector 209 may retrieve the target image. When in receipt of the target image, the object detector 209 is able to perform object detection on the target image. If the object detector 209 detects one or more objects of the specific type in the target image it will conclude that the detected one or more objects were present also in the source image. The detections may be transformed back to the source image by transforming them using the inverse pixel transforms $T^{-1}$.

Different Inverse Pixel Transforms $T^{-1}$

Different inverse pixel transforms $T^{-1}$ will now be described in more detail. In the description below, the camera 108 is mounted at a height, i.e., in the ceiling, and is capturing the image of the object 104 from above.

It should be noted that the equations relating to the different inverse pixel transforms $T^{-1}$ are given for the case when the camera 108 is a pinhole camera, i.e., a camera with a narrow-angle lens. In case the camera 108 is a fisheye camera, i.e., a camera with a fisheye lens, the inverse pixel transform $T^{-1}$ may be combined with a dewarping transform $T_{dewarp}$ taking the difference between the fish-eye lens and the narrow-angle lens into consideration. The reason for this is that the spherical view of the fisheye camera causes angular distortion of straight lines, giving objects a strange bulged and deformed appearance. Therefore, a dewarping transform $T_{dewarp}$ is applied to take the output of a fisheye lens and correct the deformed image so that lines appear straight again, and the objects look normal. The image may also be rotated so that all portions of the view appear right-side-up.

Further, it should be understood that the inverse pixel transform $T^{-1}$ is a transformation that transforms a distance $d_t$ from the principal point in the target image to a distance $d_p$ from the principal point in the source image produced by the pinhole camera, i.e., $d_p=T^{-1}(d_t)$. The cameras used in the real world today are not perfect pinhole cameras. However, their images may be transformed using classical dewarping transforms to produce the same images as a pinhole camera would produce. Such a dewarping transform $T_{dewarp}$ may be combined with one of the inverse pixel transforms $T^{-1}$ described herein in order to apply them to real world cameras. The same approach may be used to apply them to different types of cameras, such as for example fisheye cameras, by using different dewarping parameters in the dewarping transform $T_{dewarp}$. Let $T_{dewarp}^{-1}$ be the inverse dewarping transform that transforms the distance $d_p$ into the distance $d_s$ from the principal point of a warped source image, i.e., $d_s=T_{dewarp}^{-1}(d_p)$. The full transform going from the target image to the warped image produced by the fisheye camera then becomes $d_s=T_{dewarp}^{-1}(T^{-1}(d_t))$.

For example, the inverse dewarping transform $T_{dewarp}^{-1}$ may be a polynomial relating a viewing angle alpha=arctan $(d_p/f)$ to the distance $d_s$ as:

$$d_s=c_0+c_1\text{alpha}+c_2\text{alpha}^2+c_3\text{alpha}^3+c_4\text{alpha}^4$$

wherein $c_0$, $c_1$, $c_2$, $c_3$ and $c_4$ are constants describing the lens used, e.g., describing the used narrow-angle lens or the used fisheye lens. The focal length of the lens is given by f. The viewing angle is sometimes referred to as an angle of view or a field of view. For a fisheye lens, the viewing angle alpha may be between 100 and 180 degrees. The constants $c_0$, $c_1$, $c_2$, $c_3$ and $c_4$ may for a fisheye camera be $c_0=0$, $c_2=0.01$, $c_3=0.03$, $c_4=0.001$, just to give an example. However, it should be understood that the constants may be varied to describe another type of fisheye lens or a narrow-angle lens.

Height Scaling and Box Scaling

In some embodiments, herein described as relating to height scaling and box scaling, respectively, the inverse pixel transform $T^{-1}$ is a function depending on a scaling factor $s_{factor}$, and on the distance $d_t$ between the principal point $P_t$ of the target image and the target pixel to which the inverse pixel transform $T^{-1}$ is to be applied.

The determination of the inverse pixel transform $T^{-1}$ for embodiments relating to height scaling will now be described. For these embodiments, the inverse pixel transform $T^{-1}$ may be seen as a transform that will rescale the source image with a scale factor that varies over the image and is proportional to the inverse of the height $h_{object}$ of the object 104 viewed from a camera 108 installed at a height $h_{camera}$ and looking straight down. Referring back to FIG. 3, and letting $z_1 = h_{camera}$, $z_2 = h_{camera} - h_{object}$ and $z_0 = (z_1 + z_2)/2$ be the bottom, top and centre z-coordinates of the object 104 in the world xz-coordinate system. An object centre that is located at a lateral distance x from the optical axis is projected onto a pixel of the source image located do pixels from the principal point will have $x = z_0 d_0/f$ and equivalently $d_0 = fx/z_0$, and the projected height of that object in the source image will be:

$$d_2 - d_1 = f(x/z_2 - x/z_1) = (z_0/z_2 - z_0/z_1)d_0 = s_{factor} d_0,$$

where $s_{factor} = (z_0/z_2 - z_0/z_1)$.

Let F(d) define a function that scales the target image with this projected height in every pixel. That will give the inverse of the pixel transformation that is to be applied to normalize the size of the object 104 in the target image. Thus, the inverse pixel transform $T^{-1}$ is equal to F(d). However, the function F(d) breaks down in the centre of the source image where the projected height would be 0. Therefore, a distance threshold value $d_{cutoff}$ is introduced and the scale is set to be constant $s_{center}$ for distances d below the distance threshold $d_{cutoff}$. The local scaling of a function is its derivative, which gives $$F'(d) = s_{factor} d + s_1 \text{ if } d \geq d_{cutoff}, \text{ and}$$

$F'(d) = s_{center}$ if $d \leq d_{cutoff}$;
wherein $s_1$ is an unknown constant. Integrating this gives:

$$F(d) = s_{factor} d^2/2 + s_1 d + s_0 \text{ if } d \geq d_{cutoff} \text{ and}$$

$F(d) = s_{center} d + \hat{s}_0$ if $d \leq d_{cutoff}$;
wherein $s_0$ and $\hat{s}_0$ are some unknown constants.

The image centre at distance d=0 should remain at d=0, i.e.,

F(d=0)=0 giving that $\hat{s}_0 = 0$.
Also, the scale and position at the distance threshold $d_{cutoff}$ should be the same for the two pieces of the function, i.e.,
$F'(d_{cutoff}) = s_{factor} d_{cutoff} + s_1 = s_{center}$ giving that $s_1 = s_{center} - s_{factor} d_{cutoff}$, and
$F(d_{cutoff}) = s_{factor} d_{cutoff}^2/2 + s_1 d_{cutoff} + s_0 = s_{center} d_{cutoff}$
giving that $s_0 = s_{center} d_{cutoff} - s_{factor} d_{cutoff}^2/2 - s_1 d_{cutoff} = s_{factor} d_{cutoff}^2/2$ Thus, for embodiments relating to height scaling, the inverse pixel transform $T^{-1}$ as a function of the distance $d_t$ is given by:

$T^{-1}(d_t) = s_{factor} d_t^2/2 + s_1 d_t + s_0$ if $d_t > d_{cutoff}$ and
$T^{-1}(d_t) = s_{center} d_t$ if $d_t \leq d_{cutoff}$; and wherein:
$s_1 = s_{center} - s_{factor} d_{cutoff}$;
$s_0 = s_{factor} d_{cutoff}^2/2$;
$s_{factor}$ is the scaling factor given by $s_{factor} = [(z_0/z_2) - (z_0/z_1)]$;
$z_1$ is the camera mounting height above ground;
$z_2$ is the camera mounting height above ground minus the assumed object height;
$z_0$ is an assumed height above ground of a centre of the object of the specific type and is given by $(z_1 + z_2)/2$;
$d_t$ is the distance in the target image from the principal point $P_t$ to the target pixel to which the inverse pixel transform $T^{-1}$ is to be applied;
$d_{cutoff}$ is a distance threshold value at which an object of the specific object type in the source image will have the same size as the object of the specific object type in the target image; and
$s_{center}$ is a constant scaling factor used for source pixels located within the distance $d_{cutoff}$ from the principal point P.

In some embodiments relating to box scaling, the object 104 of the specific type is modelled as a bounding box. This may be the case when the object 104, being for example a person, is modelled using a rectangular shape. The bounding box may be referred to as an enclosing box.

Figure 8:
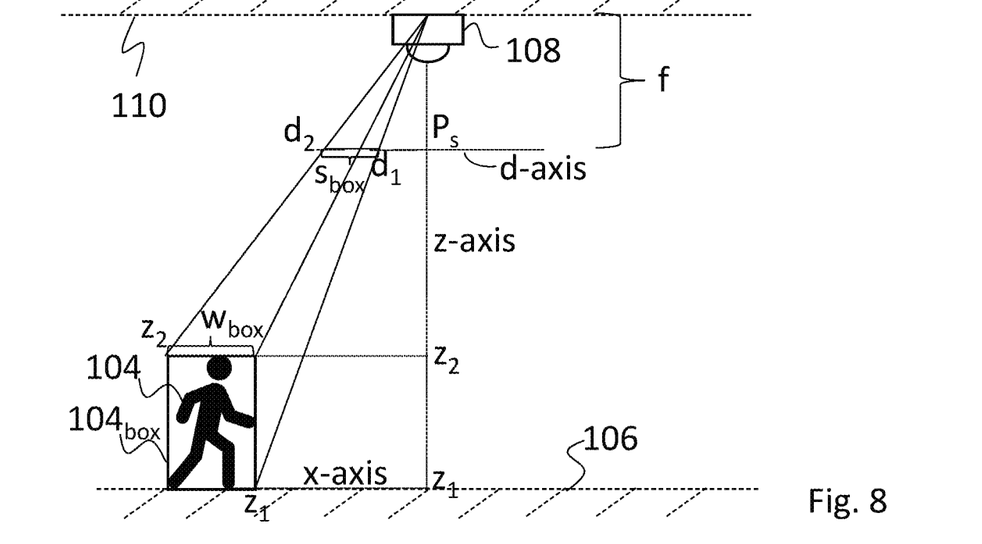
FIG. 8 schematically illustrates an exemplifying geometrical relationship between a camera and an object when the object is modelled using a bounding box.

The determination of the inverse pixel transform $T^{-1}$ for embodiments relating to box scaling will now be described. To avoid the need to specify a distance cutoff threshold, i.e., the distance threshold $d_{cutoff}$ mentioned above, it is possible to consider a bounding box instead of only considering the height. The bounding box may be a full 3D bounding box. For simplicity, the bounding box is assumed to be a rotated bounding box that always faces the camera. FIG. 8 schematically illustrates an exemplifying geometrical relationship between the object 104 and the camera 108 when the object 104 is modelled using a bounding box $104_{box}$. The projected height of such a box $104_{box}$ in the source image will be the projected height of the object 104 of the specific type as in the height scaling approach plus the projected height of the top of the box. The top of the box, which is $w_{box}$ wide and located at position x, will have a projected height $s_{box}$ in the source image that is given by:

$$s_{box} = (x + w_{box})/z_2 - x/z_2 = w_{box}/z_2.$$

The total projected height will then be $s_{factor} d + s_{box}$ and this gives the pixel transformation function by letting:

$$F'(d) = s_1(s_{factor} d + s_{box}),$$

wherein $s_1$ is an unknown constant that can be defined by specifying that the scale at the center is set to be $s_{center}$:
$F'(0) = s_1 s_{box} = s_{center}$ giving that $s_1 = s_{center}/s_{box}$ which gives that:
$F'(d) = s_{center}/s_{box} (s_{factor} d + s_{box}) = s_{center} s_{factor} d/(s_{box}) + s_{center}$.

Integrating F'(d) gives that:
$F(d) = [s_{center} s_{factor}/(2 s_{box})] d^2 + s_{center} d$;
wherein the constant has been set to 0 to have F(d=0)=0.

Thus, in embodiments relating to box scaling and since the inverse pixel transform $T^{-1}$ is equal to F(d), the inverse pixel transform $T^{-1}$ as a function of the distance $d_t$ is given by:
$T^{-1}(d_t) = [s_{center} s_{factor}/(2 s_{box})] d_t^2 + s_{center} d_t$; wherein,
$d_t$ is the distance in the target image from the principal point $P_t$ to the target pixel to which the inverse pixel transform $T^{-1}$ is to be applied;
$s_{center}$ is a constant scaling factor used for target pixels located at the principal point $P_t$;
$s_{factor}$ is the scaling factor given by $s_{factor} = [(z_0/z_2) - (z_0/z_1)]$;
$z_1$ is the camera mounting height above ground;
$z_2$ is the camera mounting height above ground minus the assumed object height; and
$s_{box}$ is the projected height of the top of the bounding box, which, if the bounding box is $w_{box}$ wide, is given by $s_{box} = w_{box}/z_2$.

By the respective inverse pixel transforms $T^{-1}$ according to the height scaling and the box scaling approaches, the size of the object is normalized in one size dimension of the depicted one or more objects of the specific object type. In the example when the object 104 is a person and the size is a length of the person, the respective inverse pixel transforms $T^{-1}$ according to the height scaling and the box scaling approaches will normalize the size of the object in the object's length direction.

Constant Size

In some embodiments, herein described as relating to transforming objects into a constant size, the inverse pixel transform $T^{-1}$ applied to each target pixel forces the target pixels to reproduce the depicted one or more objects 104 of the specific object type in the target image with a constant size in the at least one size dimension irrespective of the location of each of the depicted one or more objects of the specific object type in the target image.

The determination of the inverse pixel transform $T^{-1}$ for embodiments relating to a constant size approach will now be described. Letting the scale be relative to the projected object's height, as for example in the height scaling approach described above, does not necessarily mean that the height of the transformed object will be constant, i.e., the same, at different locations of the target image. The reason for this is that different parts of the object 104 will be transformed with different scales when using the inverse pixel transform $T^{-1}$ as in the height scaling approach. Therefore, in the constant size approach the transformed height of an object of known height is enforced to always be the same, i.e., constant. An object located at d0 in the target image will be located at $x=d_0/fz_0$ in the world with its top located at $d_2=fx/z_2=fd_0/fz_0/z_2=d_0z_0/z_2$ and similarly its bottom at $d_1=d_0z_0/z_1$. Assume that the transformed height, using the pixel transformation T, of an object is c, then:

$T((d_0z_0)/(z_2))-T((d_0z_0)/(z_1))=c$.

Also assume that $T(d)=a \log(d)+b$ for some constants a and b, then:

$c=(a \log((d_0z_0)/(z_2))+b)-(a \log((d_0z_0)/(z_1))+b)=a \log(z_1/z_2)$ giving that $a=c/(\log(z_1/z_2))$.

After introducing a distance threshold $d_{cutoff}$ as in the height scaling approach, this gives the inverse pixel transform:

$T^{-1}(d)=\exp^{[(d-b)/a]}$ if $d>d_{cutoff}$ and, $T^{-1}(d)=d$ if $d\leq d_{cutoff}$.

At the distance threshold $d_{cutoff}$ the position should be the same. Thus:

$T^{-1}(d_{cutoff})=\exp((d_{cutoff}-b)/a)=d_{cutoff}$ giving that $b=d_{cutoff}-a \log d_{cutoff}$ and by fixing the height c of the object at the distance threshold $d_{cutoff}$ where $T^{-1}(d_{cutoff})=d_{cutoff}$ gives that:

$c=[(d_{cutoff})(z_0/z_2)]-[(d_{cutoff})(z_0/z_1)]$.

Thus, for embodiments relating to the constant size approach, the inverse pixel transform $T^{-1}$ as a function of the distance $d_t$ may be given by:

$T^{-1}(d_t)=\exp^{[(dt-b)/a]}$ if $d_t>d_{cutoff}$ and, $T^{-1}(d_t)=d_t$ if $d_t\leq d_{cutoff}$; wherein $a=c/[\log(z_1/z_2)]$;

$b=d_{cutoff}-a \log(d_{cutoff})$;

c is a parameter specifying a size in the target image of an object 104 of the specific object type and is set to $c=[(d_{cutoff})(z_0/z_2)]-[(d_{cutoff})(z_0/z_1)]$ to make the object at the distance $d_{cutoff}$ in the source image and in the target image of equal size;

$z_0$ is an assumed height above ground of a centre of an object 104 of the specific type and is given by $(z_1+z_2)/2$;

$z_1$ is the camera mounting height above ground;

$z_2$ is the camera mounting height above ground minus the assumed object height;

$d_t$ is the distance in the target image from the principal point P to the target pixel to which the inverse pixel transform $T^{-1}$ is to be applied; and $d_{cutoff}$ is a distance threshold value at which distance from the principal point an object of the specific object type in the source image will have the same size as the object of the specific object type in the target image.

By the inverse pixel transform $T^{-1}$ according to the constant size approach, the size of the object is normalized in one size dimension of the depicted one or more objects of the specific object type. In the example when the object 104 is a person and the size is a length of the person, the inverse pixel transform $T^{-1}$ according to the constant size approach will normalize the size of the object in the object's length direction.

Sphere Scaling

Figure 9:
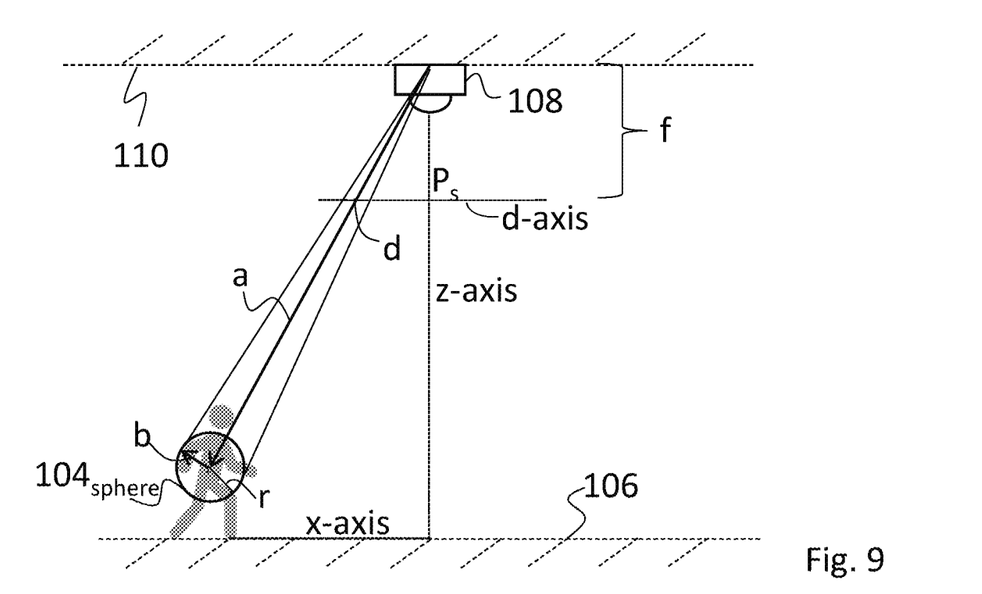
FIG. 9 schematically illustrates an exemplifying geometrical relationship between a camera and an object when a part of the object is modelled using a sphere.

In some embodiments, herein described as relating to sphere scaling, at least one part of the object 104 of the specific object type is modelled as a sphere, and a scaling factor is proportional to a projected radius r of the sphere in the source image.

The determination of the inverse pixel transform $T^{-1}$ for embodiments relating to sphere scaling will now be described. In these embodiments, the object 104 is represented with a sphere and a scale factor is set to be proportional to the radius of the projection of that sphere. FIG. 9 schematically illustrates an exemplifying geometrical relationship between the object 104 and the camera 108 when a part of the object 104 is modelled using a sphere 104$_{sphere}$ having a radius r. The center of the sphere 104$_{sphere}$ is projected to the source pixel at the distance d from the principal point P. Denote a vector a from the camera 108 to the sphere center as:

$a=(a_x,a_z)=(zd/f,z)$.

To find the boarders of the sphere 104$_{sphere}$, the vector a can be rotated 90 degrees into a vector $b=(-a_z, a_x)$. The borders, p and q, can then be found as:

$p=(p_x,p_z)=a+rb/|b|$;

$q=(q_x,q_z)=a-rb/|b|$;

which can be projected back into the source image at pixels $d_p=fp_x/p_z$ and $d_q=fq_x/q_z$. The diameter of the projection would be:

$$s(d) = d_p - d_q \frac{2r\sqrt{z^2(1+(d)^2)}}{z^2 - r^2(d)^2 + (d)^2 z^2} \frac{(1+(d)^2)}{};$$

and if the scale in the center is to be 1, a pixel transformation with a local scaling of $s(d)/s(0)$ at a distance d is to be applied. Integrating $s(d)$ gives the inverse pixel transform $T^{-1}(d)$ as:

$$T^{-1}(d) = \int \frac{s(d)}{s(0)} d(d).$$

Thus, in such embodiments relating to sphere scaling, the inverse pixel transform $T^{-1}$ as a function of the distance $d_t$ in the target image is given by:

$$T^{-1}(d_t) = \int \frac{s(d_t)}{s(0)} d(d_t);$$

wherein:

$$s(d_t) = \frac{2r\sqrt{z^2(1+(d_t)^2)}}{z^2 - r^2(d_t)^2 + (d_t)^2 z^2} \frac{(1+(d_t)^2)}{};$$

$$s(0) = \frac{2r}{z};$$

z is an assumed distance between the camera 108 and the at least one part of the object 104 modelled as the sphere; and $d_t$ is the distance in the target image from the principal point $P_t$ to the target pixel to which the inverse pixel transform $T^{-1}$ is to be applied.

If the integration above is performed numerically between 0 and 4 and a 4th degree polynom is fitted to the result, the inverse pixel transform $T^{-1}$ is for r=250 and z=270−180+r (in lightning_crowd: lens.py, rectst_sphere.py) given by $T^{-1}(d_t) = -0.020750756^4 + 0.21880565 d_t^3 + 0.281135226 d_t^2 + 0.83111921 d_t + 0.01962886$.

The at least one part of the object 104 modelled as a sphere may be a head or a torso when the object 104 is a person.

By the inverse pixel transform $T^{-1}$ according to the sphere scaling approach, the size of the object is normalized in two size dimensions of the depicted one or more objects of the specific object type. In the example when the object 104 is a person and the size is two dimensional and given by a length and a width of the person, the inverse pixel transform $T^{-1}$ according to the sphere scaling approach will normalize the size of the object in both the object's length direction and width direction.

Embodiments also relate to the image processor 208 configured to provide a target image for evaluation with the object detector 209. The image processor 208 is configured to obtain a source image captured by an image capturing module 206 and depicting one or more objects 104 in a scene 102. The image processor 208 is further configured to apply an inverse pixel transform $T^{-1}$ to each target pixel of a target image to determine one or more source pixels located at a position in the source image corresponding to a position of each target pixel in the target image. Furthermore, the image processor 208 is configured to assign, to each target pixel, a target pixel value determined based on one or more source pixel values of the determined one or more source pixels located at the corresponding position, thereby is a size c in the target image of depicted one or more objects of the specific object type normalized in at least one size dimension of the depicted one or more objects of the specific object type. Yet further, the image processor 208 is configured to feed the target image to an object detector for evaluation.

Embodiments also relate to a camera 108 for providing a target image that is to be evaluated by the object detector 209. The camera 108 comprises the image processor 208. The camera 108 is, e.g., by means of the image capturing module 208, configured to capture the source image depicting the one or more objects 104 in the scene 102. Further, the camera 108 is configured to provide the source image to the image processor 208. Furthermore, the camera 108 comprises the object detector 209 configured to receive the target image and to evaluate the target image by performing object detection on the target image.

Embodiments also relates to a non-transitory computer-readable medium having stored thereon computer code instructions adapted to carry out embodiments of the method described herein when executed by a device having processing capability.

As described above, the camera 108, e.g., the image processor 208 of the camera 108, may be configured to implement a method for providing the target image. For this purpose, the camera 108, e.g., the image processor 208 of the camera 108, may include circuitry which is configured to implement the various method steps described herein.

In a hardware implementation, the circuitry may be dedicated and specifically designed to implement one or more of the method steps. The circuitry may be in the form of one or more integrated circuits, such as one or more application specific integrated circuits or one or more field-programmable gate arrays. By way of example, the camera 108 may hence comprise circuitry which, when in use, obtains a source image, and applies an inverse pixel transform $T^{-1}$ to each target pixel of the target image to determine one or more source pixels located at a position in the source image corresponding to a position of each target pixel in the target image. The camera 108 may further comprise circuitry which, when in use assigns, to each target pixel, a target pixel value determined based on one or more source pixel values of the determined one or more source pixels located at the corresponding position. Thereby is a size c in the target image of depicted one or more objects of a specific object type normalized in at least one size dimension of the depicted one or more objects of the specific object type. The camera 108 may further comprise circuitry which, when in use feeds the target image to an object detector for evaluation.

In a software implementation, the circuitry may instead be in the form of a processor, such as a microprocessor, which in association with computer code instructions stored on a (non-transitory) computer-readable medium, such as a non-volatile memory, causes the camera 108, e.g., the image processor 208 of the camera 108, to carry out any method disclosed herein. Examples of non-volatile memory include read-only memory, flash memory, ferroelectric RAM, magnetic computer storage devices, optical discs, and the like. In a software case, each of the method steps described above may thus correspond to a portion of computer code instructions stored on the computer-readable medium, that, when executed by the processor, causes the camera 108 to carry out any method disclosed herein.

It is to be understood that it is also possible to have a combination of a hardware and a software implementation, meaning that some method steps are implemented in hardware and others in software.

It will be appreciated that a person skilled in the art can modify the above-described embodiments in many ways and still use the advantages of the disclosure as shown in the embodiments above. For example, the camera 108 does not need to be a single unit comprising the image capturing module 206 and the image processing and encoding module 214 at one location but it could be a virtual unit, wherein image capturing part 206 and the image processing and encoding module 214 operate together but they are provided at different locations. Further, the object detector 209 does not need to be arranged in the image processor 208, but could be arranged as a separate unit of the image processing and encoding module 214 and could be arranged in communication with the image processor 208, the encoder 210, the input and output interface 212, and the data storage 214. Thus, the disclosure should not be limited to the shown embodiments but should only be defined by the appended claims. Additionally, as the skilled person understands, the shown embodiments may be combined.

The invention claimed is:

1. A method to provide a target image for evaluation with an object detector configured to detect objects of a specific object type, the method comprises:

obtaining a source image captured by a fisheye camera and depicting one or more objects in a scene, wherein the camera is mounted to capture images of the scene from above;

combining an inverse dewarping transform $T^{-1}_{dewarp}$ with an inverse pixel transform $T^{-1}(d_t)$ into a full inverse transform $T^{-1}_{dewarp}$ ($T^{-1}$ ($d_t$)), wherein the inverse dewarping transform $T^{-1}$ dewarp depends on the type of fisheye camera and wherein the inverse pixel transform $T^{-1}$ ($d_t$) as a function of a distance $d_t$ from a principal point Pt of the target image to the target pixel to which the inverse pixel transform $T^{-1}$ ($d_t$) is applied, is given by:

$T^{-1}$ ($d_t$)=exp[($d_t$-b)/a] if $d_t$>$d_{cutoff}$ and $T^{-1}$ ($d_t$)=$d_t$ if $d_t \leq d_{cutoff}$; and wherein:

$a=c/[\log(z_1/z_2)]$;

$b=d_{cutoff}-a \log(d_{cutoff})$;

c is a parameter specifying a size in the target image of an object of the specific object type and is set to $c=[(d_{cutoff})(z_0/z_2)]-[(d_{cutoff})(z_0/z_1)]$ to make the object at the distance $d_{cutoff}$ in the source image and in the target image of equal size;

$z_0$ is an assumed height above ground of a center of an object of the specific type and is given by $(z_1+z_2)/2$;

$z_1$ is the camera mounting height above ground;

$z_2$ is the camera mounting height above ground minus the assumed object height; and $d_{cutoff}$ is a distance threshold value at which an object of the specific object type in the source image will have the same size as the object of the specific object type in the target image;

applying the full inverse transform $T^{-1}_{dewarp}(T^{-1}(d_t))$ to each target pixel of a target image to determine one or more source pixels located at a position in the source image corresponding to a position of each target pixel in the target image, assigning, to each target pixel, a target pixel value determined based on one or more source pixel values of the determined one or more source pixels located at the corresponding position, thereby is a size c in the target image of depicted one or more objects of a specific object type normalized in at least one size dimension of the depicted one or more objects of the specific object type; and providing the target image to the object detector for evaluation.

2. The method of claim 1, wherein the target pixels reproduce the depicted one or more objects of the specific object type in the target image with a constant size in the at least one size dimension irrespective of the location of each of the depicted one or more objects of the specific object type in the target image.

3. The method of claim 2, wherein the inverse pixel transform $T^{-1}$ is rotationally symmetric around a principal point Pt of the target image.

4. An image processor configured to provide a target image for evaluation with an object detector configured to detect objects of a specific object type; wherein the image processor is configured to:

obtain a source image captured by an image capturing module comprising a fisheye lens and depicting one or more objects in a scene, wherein the image capturing module is mounted to capture images of the scene from above, combine an inverse dewarping transform $T^{-1}$ dewarp with an inverse pixel transform $T^{-1}$ ($d_t$) into a full inverse transform $T^{-1}$ dewarp ($T^{-1}$ ($d_t$)), wherein the inverse dewarping transform $T^{-1}$ dewarp depends on the type of fisheye lens, and wherein the inverse pixel transform $T^{-1}$ as a function of a distance $d_t$ from a principal point Pt of the target image to the target pixel to which the inverse pixel transform $T^{-1}$ is applied, is given by $T^{-1}$ ($d_t$)=exp[($d_t$-b)/a] if $d_t$>$d_{cutoff}$ and $T^{-1}$ ($d_t$)=$d_t$ if $d_t \leq d_{cutoff}$; and wherein:

$a=c/[\log(z_1/z_2)]$;

$b=d_{cutoff}-a \log(d_{cutoff})$;

c is a parameter specifying a size in the target image of an object of the specific object type and is set to $c=[(d_{cutoff})(z_0/z_2)]-[(d_{cutoff})(z_0/z_1)]$ to make the object at the distance $d_{cutoff}$ in the source image and in the target image of equal size;

$z_0$ is an assumed height above ground of a center of an object of the specific type and is given by $(z_1+z_2)/2$;

$z_1$ is the camera mounting height above ground;

$z_2$ is the camera mounting height above ground minus the assumed object height; and $d_{cutoff}$ is a distance threshold value at which an object of the specific object type in the source image will have the same size as the object of the specific object type in the target image;

apply the full inverse transform $T^{-1}$ dewarp ($T^{-1}$ ($d_t$)) to each target pixel of a target image to determine one or more source pixels located at a position in the source image corresponding to a position of each target pixel in the target image;

assign, to each target pixel, a target pixel value determined based on one or more source pixel values of the determined one or more source pixels located at the corresponding position, thereby is the size c in the target image of depicted one or more objects of the specific object type normalized in at least one size dimension of the depicted one or more objects of the specific object type; and feed provide the target image to the object detector for evaluation.

5. A fisheye camera comprising the image processor of claim 4, and configured to:

capture the source image depicting the one or more objects in the scene;

provide the source image to the image processor; and wherein the camera further comprises the object detector configured to receive the target image and to evaluate the target image by performing object detection on the target image.

6. The camera of claim 5, wherein the camera is a monitoring camera.

7. A non-transitory computer-readable medium having stored thereon computer code instructions adapted to carry out a method when executed by a device having processing capability, the method providing a target image for evaluation with an object detector, the method comprising:

obtaining a source image captured by a fisheye camera and depicting one or more objects in a scene, wherein the camera is mounted to capture images of the scene from above;

combining an inverse dewarping transform $T^{-1}$ dewarp with an inverse pixel transform $T^{-1}$ ($d_t$) into a full inverse transform $T^{-1}$ dewarp ($T^{-1}$ ($d_t$)), wherein the inverse dewarping transform $T^{-1}$ dewarp depends on the type of fisheye camera and wherein the inverse pixel transform $T^{-1}$ ($d_t$) as a function of a distance $d_t$ from a principal point Pt of the target image to the target pixel to which the inverse pixel transform $T^{-1}$ ($d_t$) is applied, is given by $T^{-1}$ ($d_t$)=exp[($d_t$-b)/a] if $d_t$>$d_{cutoff}$ and $T^{-1}$ ($d_t$)=$d_t$ if $d_t \leq d_{cutoff}$; and wherein:

$a=c/[\log(z_1/z_2)]$;

$b=d_{cutoff}-a \log(d_{cutoff})$;

c is a parameter specifying a size in the target image of an object of the specific object type and is set to $c=[(d_{cutoff})$ $(z_0/z_2)] - [d_{cutoff}] (z_0/z_1)]$ to make the object at the distance $d_{cutoff}$ in the source image and in the target image of equal size;

$z_0$ is an assumed height above ground of a center of an object of the specific type and is given by $(z_1+z_2)/2$;

$z_1$ is the camera mounting height above ground;

$z_2$ is the camera mounting height above ground minus the assumed object height; and $d_{cutoff}$ is a distance threshold value at which an object of the specific object type in the source image will have the same size as the object of the specific object type in the target image;

applying the full inverse transform $T^{-1}_{dewarp}(T^{-1}(d_t))$
to each target pixel of a target image to determine one or more source pixels located at a position in the source image corresponding to a position of each target pixel in the target image, assigning, to each target pixel, a target pixel value determined based on one or more source pixel values of the determined one or more source pixels located at the corresponding position, thereby is a size c in the target image of depicted one or more objects of a specific object type normalized in at least one size dimension of the depicted one or more objects of the specific object type; and providing the target image to an object detector for evaluation.

8. The non-transitory computer-readable medium of claim 7, wherein the method further comprises:

wherein the target pixels reproduce the depicted one or more objects of the specific object type in the target image with a constant size in the at least one size dimension irrespective of the location of each of the depicted one or more objects of the specific object type in the target image.

9. The non-transitory computer-readable medium of claim 7, wherein:

the inverse pixel transform $T^{-1}$ is rotationally symmetric around a principal point Pt of the target image.

* * * * *